3,625,723
Patented Dec. 7, 1971

3,625,723
FOAMED CERAMIC COMPRISING FLY ASH AND PHOSPHORIC ACID

Richard W. Sicka, Brecksville, Ohio, assignor to Horizons Incorporated, a division of Horizons Research Incorporated
No Drawing. Filed Aug. 5, 1969, Ser. No. 847,720
Int. Cl. C04b 1/00
U.S. Cl. 106—86                                                 7 Claims

ABSTRACT OF THE DISCLOSURE

A lightweight foamed ceramic containing fly ash, an acidic phosphate and a filler which sets hydraulically with the phosphate without heating.

---

This invention relates to a light weight insulating ceramic material and to the manner in which it is formed. More particularly, it relates to improvements over the ceramic compositions described in U.S. Pat. No. 3,330,675, issued July 11, 1967.

Like the composition described in the above noted patent, the ceramic compositions of this invention are capable of being foamed and formed into useful porous cellular products without the application of heat from any external source.

The new and different ceramic foam materials of this invention are improvements over the prior art compositions described in the aforementioned patent and in which fly ash materials resulting from the combustion of pulverized coal are utilized as a low cost constituent of the foamable compositions.

The use of fly ash in ceramic compositions has been described in U.S. Pats. 2,250,107; 2,382,154; 2,606,126 and 2,948,948; and others, and in the literature (e.g. in vol. 33 of the Proceedings of the American Concrete Institute, pages 577–612 (1937) and in Brick and Clay Record, April 1965, pages 78 et seq.).

As disclosed in the above prior art, fly ash differ in chemical composition depending on the coal from which they are derived, the combustion process and the manner in which the fly ash is collected, but in general, the principal constituents of fly ash are silica, and oxides of aluminum, iron and calcium, which oxides may combine with the silica as silicates, together with some free unburned carbon and some alkalies or other oxides.

One object of this invention is to provide a foamable composition which includes the mixture of compounds present in the fly ash resulting from the combustion of pulverized coal, and which is bonded by the aluminum oxide—phosphoric acid solution described in the above noted patent.

It is another object of this invention to provide a foamable composition which includes fly ash because of its specially derived nature and physical properties, partly due to the existence of the fly ash in the foam of near spheroidal particles of minute dimension and irregular shaped particles with high surface area which promote bonding. The spherical particles appear to enhance the compressive strength of the foam, wherein the fly ash functions as a moderately reactive filler depending on its chemical composition.

Still another object of this invention is to provide a moderate weight porous ceramic which is foamed without the application of external heat utilizing low cost materials.

Another object of this invention is to provide a low density refractory composition which attains a stable set without the application of heat and which achieves a very rapid set through the controlled application of heat.

Still another object of this invention is to provide a light, neutral colored ceramic composition containing fly ash materials resulting from the combustion of pulverized coal and imparting an improvement in the physical properties of the foam material, without deleteriously imparting an unattractive muddy red brown color to the product.

Still another object of this invention is a light weight insulating material which is highly resistant to attack by the environment and which performs well with respect to fire resistance and thermal insulation at high temperatures and which possesses improved properties of physical strength.

These and other objects will become apparent from the examples which follow and which are to be considered illustrative rather than limiting the invention.

EXAMPLE 1

To a commercially available aluminum acid phosphate solution additions of alumina or hydrated alumina or 85% $H_3PO_4$ are made until the solution approximates the following molar proportions of $$Al_2O_3 : P_2O_5 : H_2O - 0.8 : 3 : 26.0$$

In a separate mixer the following dry ingredients were blended to obtain a uniform mixture.

|  | Parts by wt. |
|---|---|
| Fly ash, derived from combustion of pulverized coal | 27 |
| Calcium silicate, minus 325 mesh | 26 |
| Aluminum hydroxide, light grade | 6 |
| Magnesium carbonate | .5 |

To prepare the foam, 40 parts by weight of aluminum phosphate solution is added to the dry mixture and then stirred mechanically for a period of not more than two minutes. This composition foams and sets in about 20 minutes to a density of 45 lbs./cu. ft.

In spite of the fact that the fly ash is usually reddish or dark brown in color, it is noted that when combined with the acid aluminum phosphate, as in Example 1, the fly ash appears to react with the acid phosphate and turns grey white, a color which is much more acceptable for many uses, than the dark muddy color of the blended dry mixture. Further, drying the foamed material in an oven for several minutes at 135° C. to 165° C., for example, tends to change the material to a much lighter grey color.

EXAMPLE 2

|  | Parts by wt. |
|---|---|
| Acid aluminum phosphate solution (molar ratio) $Al_2O_3 : P_2O_5 : H_2O (0.8 : 3 : 18.5)$ | 40 |
| Fly ash, derived from combustion of pulverized coal | 45 |
| Calcium silicate (minus 325 mesh) | 10 |
| Aluminum hydroxide, light grade | 5 |
| Barium carbonate | 1 |

The same mixing procedure as in Example 1 was employed and after 15 minutes a set foam was obtained which had a density of about 25 lbs./cu. ft.

EXAMPLE 3

|  | Parts by wt. |
|---|---|
| Acid aluminum phosphate $Al_2O_3 : P_2O_5 : H_2O$ (molar ratio) 0.8 : 3 : 20 | 40 |
| Fly ash, derived from combustion of pulverized coal | 45 |
| Calcium silicate (minus 325 mesh) | 10 |
| Aluminum hydroxide, light grade | 5 |
| Magnesium carbonate | 1 |

After employing the mixing procedure as described above, a set foam was achieved with the density of about 30 lbs./cu. ft.

EXAMPLE 4

Similar results were obtained when a cationic surface agent was added to the liquid portion of the mixture of Example 3 before adding it to the dry mixture.

Instead of the aluminum phosphates which are most suitable in the present invention, other phosphates, including the phosphates of lime, zirconia and of other compounds of lime, alumina or zirconia, which react as bases when reacted wtih phosphoric acid may be used. Suitable proportions of such oxides or oxide containing material to $P_2O_5$ in the phosphoric acid, are about 1 mole of basic oxide to between 0.2 and 4 moles of $P_2O_5$.

In the foamable compositions of this invention the resulting acid phosphate is present in approximately equal weight to the water in the foamable mixture, including water added to the aqueous acidic phosphate.

In the foamable compositions of this invention, the preferred filler is wollastonite, a relatively pure calcium silicate, in proportions within the range from 10 parts of filler to 90 parts of acidic phosphate plus water to 70 parts of filler for each 30 parts by weight of acid phosphate plus water. Magnesium silicate and zircon are also suitable as fillers.

In compositions of this invention, the calcium silicate, magnesium silicate or zircon present forms hydraulically setting bonds. The fly ash is an inexpensive filler material which achieves an enhancement of strength of the foam.

In addition to the carbonates of Examples 1, 2 and 3, other gas liberating chemicals can be used, such as sulfates, nitrites and nitrates, as described in the previously noted patent. Also, as disclosed in Pat. No. 3,330,675, a mechanically introduced gas may be used to foam the mixture while it is setting, or both chemical and mechanical foaming may be used in combination.

Heating the foamed product produces a lighter color in the product and also strengthens the foamed product.

I claim:

1. A composition which sets into a rigid monolithic mass without the application of externally applied heat and which may be rendered porous by the incorporation of gas bubbles prior to complete setting of said composition; said composition consisting essentially of:
    (a) water;
    (b) an acidic phosphate consisting of phosphorus pentoxide and a material selected from the group consisting of lime, alumina, zirconia and compound of said oxides which are basic in reaction with phosphoric acid; the proportions of said oxide material to phosphorus pentoxide being 1 mole of said oxide to between 0.2 and 4 moles of phosphorus pentoxide; there being at least about 1 part by weight of acidic phosphate per part by weight of water;
    (c) a finely divided calcium silicate, the relative proportions of calcium silicate to the total of acidic phosphate plus water being approximately in the range of from 10:90 to 70:30 parts by weight calcium silicate to parts by weight said total of acidic phosphate plus water; and
    (d) a finely divided pulverized fly ash, the relative proportions by weight of calcium silicate to fly ash to total phosphate plus water being approximately in the ranges from 5:5:90 and 60:10:30 and 10:60:30, said finely divided pulverized fly ash being a material which reacts chemically when mixed with the other constituents in said composition.

2. The composition of claim 1 containing in addition a small amount of gas-liberating chemical compound, said compound being one which reacts with the acid in said composition to release a gaseous reaction product selected from the group consisting of inorganic carbonates, sulfates, nitrites and nitrates.

3. The composition of claim 1 foamed by mechanically introducing a gas into said composition while it is setting.

4. A composition according to claim 1 foamed by a combination of chemically introduced and mechanically introduced gases.

5. The composition of claim 2 subjected to heating in the range from 120° F. to 2550° F. to lighten and further strengthen the foam.

6. A foamed body comprising the composition of claim 1 foamed and set into a monolithic mass against a support.

7. A foamed composition having the composition of claim 1, containing, in addition, between 0.01 and 0.3% by weight of a cationic surface-acive agent.

References Cited

UNITED STATES PATENTS

| | | | |
|---|---|---|---|
| 1,239,152 | 9/1917 | Alexander | 106—40 R |
| 1,944,007 | 1/1934 | Hobart | 106 40 R |
| 2,405,884 | 8/1946 | Greger | 23—105 |
| 2,425,152 | 9/1947 | Greger et al. | 106—67 |
| 2,987,411 | 6/1961 | Minnick. | |
| 2,992,930 | 7/1961 | Wheeler et al. | 106—40 R |
| 3,041,190 | 6/1962 | Griffith et al. | 106—40 R |
| 3,330,675 | 7/1967 | Magder | 106—40 R |
| 3,334,052 | 8/1967 | Kurz et al. | 106—40 R |
| 3,341,341 | 9/1967 | Corson et al. | 106—40 R |

OTHER REFERENCES

Kingery, W. D.: Fundamental Study of Phosphate Bonding in Refractories: I—Literature Review, in J. Amer. Cer. Soc., 33, (8) 1950, pp. 239–241.

Vincent, R. D. et al.: Variation in Pozzolanic Behavior of Fly Ashes; in ASTM Proc., 61, 1961, pp. 1094–1100.

JAMES E. POER, Primary Examiner

W. R. SATTERFIELD, Assistant Examiner

U.S. Cl. X.R.

106—40 R, 41, 87, 88